Jan. 14, 1930.  J. R. BLACK  1,743,844
SHUTTLE TRANSMISSION
Filed March 27, 1926    2 Sheets-Sheet 1

INVENTOR
John R. Black
BY
J. M. Wilson
ATTORNEY

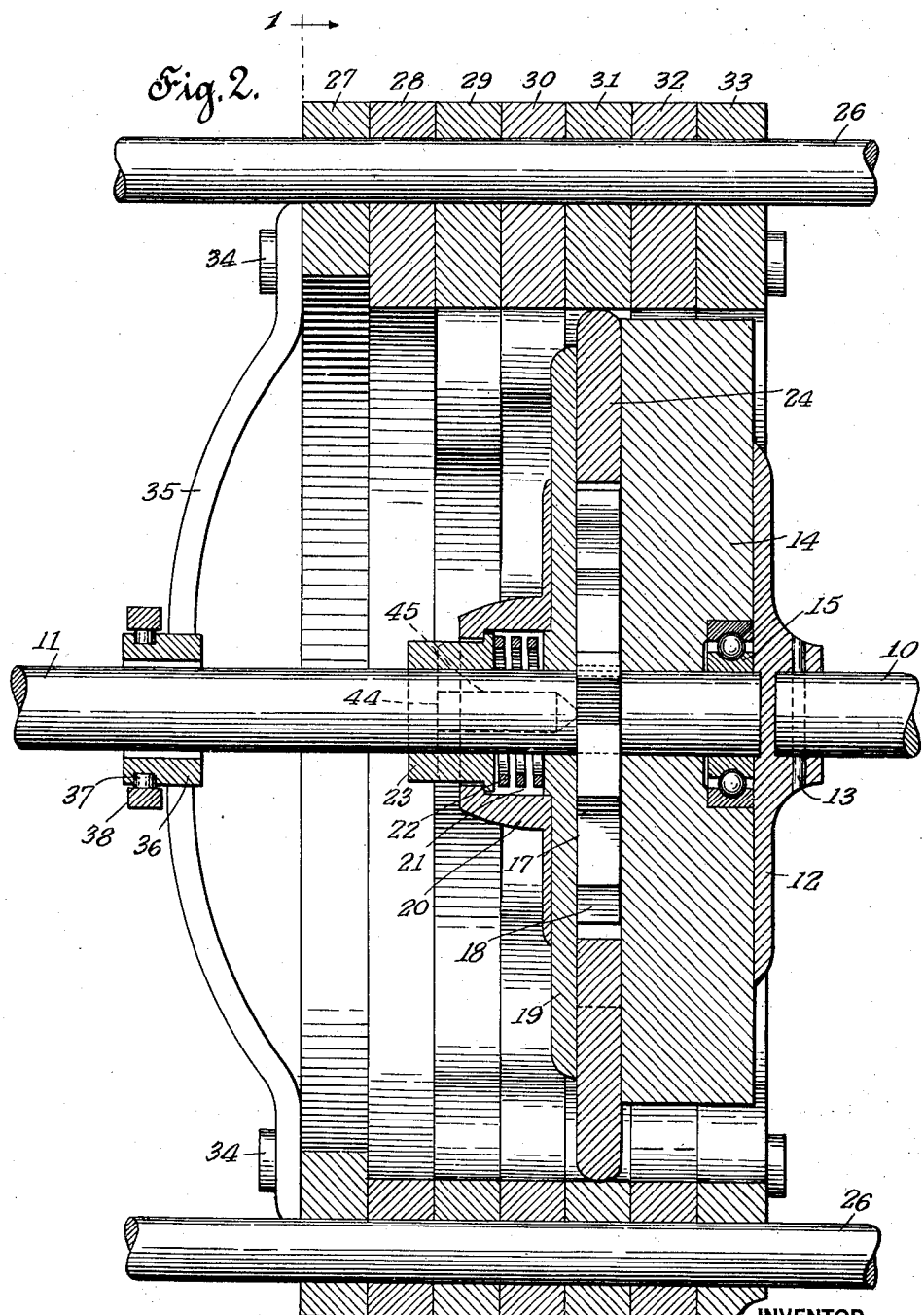

Patented Jan. 14, 1930

1,743,844

UNITED STATES PATENT OFFICE

JOHN RANDALL BLACK, OF TOULON, ILLINOIS

SHUTTLE TRANSMISSION

Application filed March 27, 1926. Serial No. 97,863.

This invention relates to power transmission devices in which a differentiation in power may be selectively attained between a driving shaft and an alined driven shaft.

One of the objects of the invention is to provide a novel, efficient and substantially silent mechanism whereby differences in speed ratio may be attained or the same speed maintained, between a pair of registering shafts, eliminating all recourse to belt shifts, change gears and like devices.

A further feature is in the provision of an essentially simple, compact mechanism capable of being conveniently applied to existing structures without material change therein.

Another aim is to produce a speed changing device that is easily and instantly controlled by a single lever in attaining the desired results, the device shown being particularly designed with reference to self propelled vehicles but is by no means limited to such use.

These several objects are accomplished by the novel construction, combination and arrangement of parts hereinafter described and shown in the drawings forming a component hereof and in which:—

Fig. 2 is a fragmentary longitudinal sectional view taken substantially on line 2—2 of Figure 1.

Figure 1:
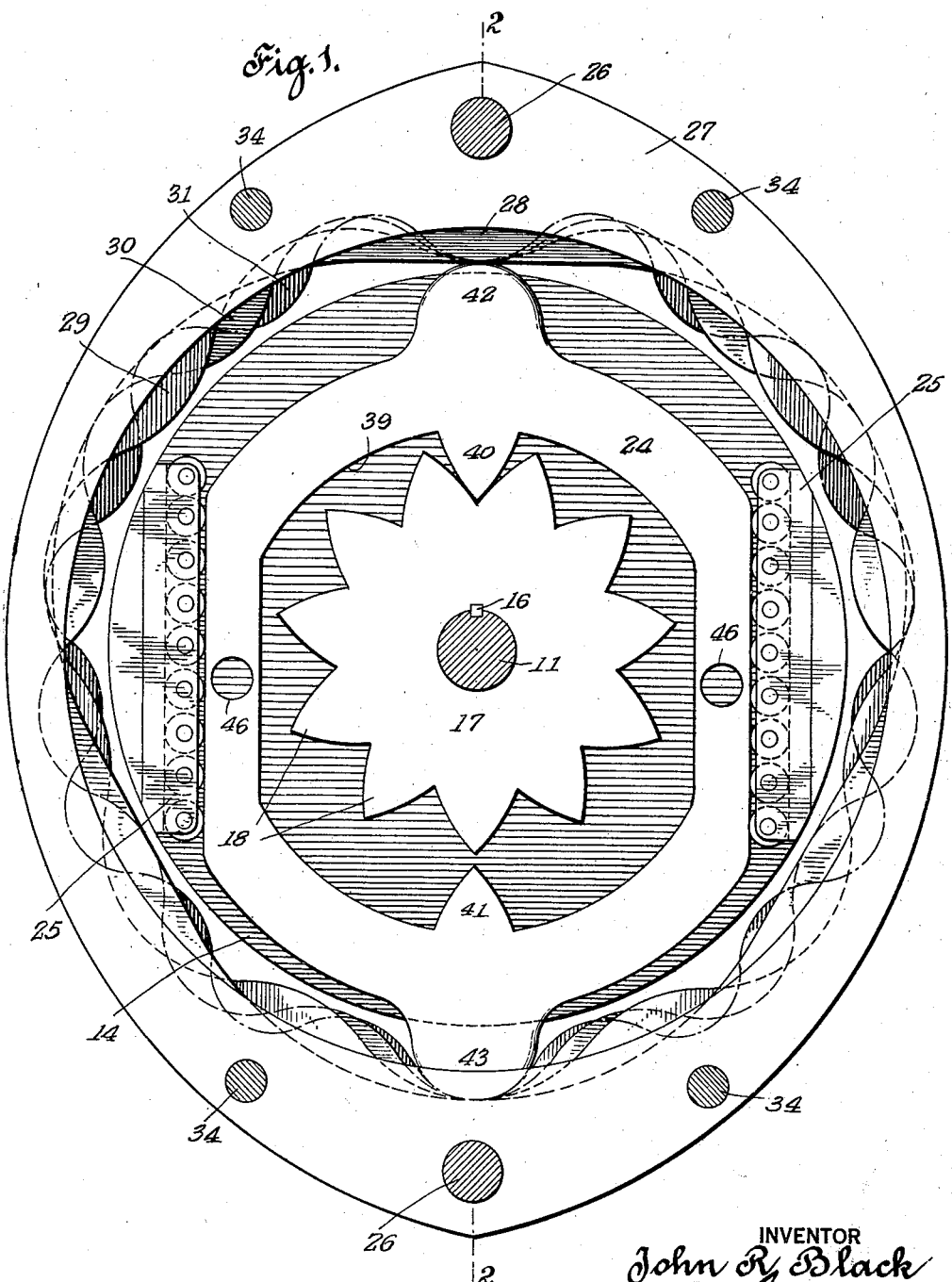
Fig. 1 is a transverse sectional view of an embodiment of a speed changing device, made in accordance with the invention, the section being taken on line 1—1 of Figure 2, certain parts being omitted for the purpose of clarity.

In these illustrations the numeral 10 designates a driving shaft propelled by any power source and operative in any preferred position and adjacent the end of the shaft, in register therewith, is a driven shaft 11, shown as of the same diameter and connected with the elements to which power is to be transmitted.

The driving shaft 10 has its end secured within a flange 12 by a key or pin 13 as shown, the flange being fixed rigidly on the outer face of a solid disc 14 into which enters the end of the driven shaft 11 to revolve therein, an anti-friction bearing 15 being provided for that purpose.

Mounted on the driven shaft 11, adjacent the disc 14 and positively driven by a key 16, is a spur wheel 17 having a series of uniformly spaced, symmetrical, substantially triangular lobes 18, their curved side edges converging into points.

Adjacent the spur wheel is a circular plate 19 having a short hub on its outer face and secured to the outer side of the plate is a flange having a hub 20 containing a recess 21 in which is a helically coiled compression spring 22, its inner end abutting the plate 19 and its outer end seating against a sleeve 23, the inner flanged end of which is held within the recess through which the main portion of the sleeve extends, the plate and sleeve being free upon the shaft 11.

Circumjacent the spur wheel 17 is a frame-like element, or shuttle 24, the same being positioned between the fly wheel 14 and plate 19. The flattened parallel side edges of the shuttle operate between a pair of opposed, straight roller or other suitable bearings 25 attached to the fly wheel 14 to reduce friction when the shuttle is actuated as later described.

Mounted in parallel to the shafts are two rigidly supported bars 26 on which are slidably mounted a series of flat plates 27, 28, 29, 30, 31, 32 and 33 tied firmly together by bolts 34, these bolts also securing to the outer plate 27 a bail-like element 35, outwardly bowed and provided with a hub 36 surrounding the driven shaft 11 but free and clear of it.

The hub 36 has an annular groove to receive rolls 37 carried on the arms 38 of a forked shifting lever, not shown, by which the several plates are shifted as a unit on the bars 26 when a change in speed of the driven shaft 11 is desired.

Returning to the shuttle 24, it will be seen that the same has an opening 39 into which extend two teeth 40 and 41, directed towards the axis of the shafts and adapted to be operatively engaged by the lobes 18 alternately, the lobes being preferably of some odd numbers, eleven being shown.

From the foregoing it will be understood that as the driving shaft is rotated, the spur wheel 17 will be moved by the shuttle intermittently, by reason of the spur wheel lobes 18 making consecutive contact with the teeth 40 and 41 of the shuttle. In neutral, the shuttle moves around the spur wheel without contact, the spur wheel therefore remaining quiescent.

On the outer, arcuate portions of the shuttle, directly opposite the teeth, are rounded lugs or knobs 42 and 43, the same being engageable progressively with undulations formed in the inner peripheries of the plates 27 to 33, in accordance with whichever of the plates is in register with the spur wheel and shuttle.

The number of undulations in each of these plates varies considerably, for instance, as follows:—Plate 27 is preferably bored circularly; plate 28 may have three cavities and corresponding convexities; plate 29 has seven, plate 30 has nine, and plate 31 representing neutral is provided with eleven or if desired this plate may be eliminated. The plates 32 and 33, used in reverse only, are provided with nine and seven undulations respectively.

It will be understood that the speed ratio of the shafts is dependent upon the relative number of points on the spur wheel 17 and the number of undulations in the plate in register with it; it will also be evident that in order to allow the shuttle 24, which has opposite symmetric ends, to move reciprocatively, all of the several plates will preferably have an odd, uneven number of undulations.

To obtain the ratio R of torque transmitted, knowing the number of lobes or spur wheel points P in the spur wheel 17 and number of undulations U in a plate, this formula is used:—

$$\left(\frac{1}{U}-\frac{1}{P}\right)U:1::1:R$$

or, as a concrete example applied to plate 30, $$\left(\frac{1}{9}-\frac{1}{11}\right)9:1::1:5.5.$$

When the plate 31 of the series or the space shown as occupied by it is moved to register with the spur wheel 17, no motion will be transmitted from the shaft 10, as the shuttle oscillates idly with the spur wheel and the spur wheel is not affected.

Upon shifting the series to bring the plate 28, having three undulations, into register with the spur wheel, a proportionate degree of torque will be transmitted to the driven shaft in the ratio of approximately 1 to 1.37; similarly the next plate 29, having seven undulations will transmit a torque ratio of 1 to 2.75 at each revolution of the driving shaft, and the plate 30, as has been shown, having nine undulations, will transmit a torque ratio of 1 to 5.5 of the driving shaft, while the plate 27, having no teeth will obviously transmit the same speed to the driven shaft as is attained by the driving shaft, since the shuttle will cease to oscillate.

When the outer plate 27 is caused to register with the spur wheel 17, the hub 36 of the bail will contact with the sleeve 23, compressing the spring 22, moving a pair of arms 44, fixed to the sleeve and carrying conically pointed detents 45, towards the fly wheel 14, the detents engaging in openings 46 formed in the side elements of the shuttle 24, locking it in a central position against lengthwise motion but permitting it to rotate within the opening in the plate 27, together with the spur wheel 17.

When the actuating lever shifts the series of plates on the fixed bars 26, in either direction, the lugs or knobs 42 and 43 have two opportunities to pass between the adjacent opposed undulations of the plates at each full revolution of the driving shaft, thus permitting of rapid change in speed.

In passing from plate 28 to plate 27, (or the reverse) these opportunities occur only at the intersections of the contours of these two plates; the opportunities numbering six to each revolution of the fly wheel.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. In a shuttle transmission device, a driving shaft; a shuttle reciprocally mounted thereon and adapted to rotate therewith, and provided with outwardly extending lugs and inwardly extending teeth; a driven shaft; a spur wheel mounted thereon and provided with a plurality of lobes adapted to engage with the teeth of the said shuttle; and means for changing the speed ratio between the driving and driven shafts comprising plate supports, a plurality of plates slidably mounted on the said supports, a series of undulations on the peripheries of said plates, and means adapted to move the said plates into and out of operative engagement with the lugs on the shuttle.

2. In a shuttle transmission device, a driving shaft; a shuttle reciprocally mounted thereon and adapted to rotate therewith, and provided with outwardly extending lugs and inwardly extending teeth; a driven shaft; a spur wheel mounted thereon and provided with a plurality of lobes adapted to engage with the teeth of the said shuttle; and means to selectively impart to the said driven shaft a predetermined percentage of torque from the driving shaft comprising plate supports, a plurality of plates slidably mounted on the said supports, a series of undulations on the peripheries of said plates, and means adapted to move the said plates into and out of operative engagement with the lugs on the shuttle.

3. In a shuttle transmission device, a driving shaft; a shuttle reciprocally mounted thereon and adapted to rotate therewith, and provided with outwardly extending lugs and inwardly extending teeth; a driven shaft; a spur wheel mounted thereon and provided with a plurality of lobes adapted to engage with the teeth of the said shuttle; and means for changing the speed ratio between the driving and driven shafts comprising plate supports, a plurality of plates slidably mounted on the said supports and provided with undulations on their peripheries; and means for shifting the said plates on their supports to selectively move the said undulations into and out of operative engagement with the lugs on the shuttle.

4. In a shuttle transmission device, a driving shaft; a shuttle reciprocally mounted thereon and adapted to rotate therewith, and provided with outwardly extending lugs and inwardly extending teeth; a driven shaft; a spur wheel mounted thereon and provided with a plurality of lobes adapted to engage with the teeth of the said shuttle; and means to selectively impart to the said driven shaft a predetermined percentage of torque from the driving shaft comprising plate supports, a plurality of plates slidably mounted on the said supports and provided with undulations on their peripheries; and means for shifting the said plates on their supports to selectively move the said undulations into and out of operative engagement with the lugs on the shuttle.

5. In a shuttle transmission device, a driving shaft; a shuttle reciprocally mounted thereon and adapted to rotate therewith, and provided with outwardly extending lugs and inwardly extending teeth; a disk wheel secured to said driving shaft; a driven shaft; a spur wheel mounted thereon and provided with a plurality of lobes adapted to engage with the teeth of the said shuttle; and means to selectively impart to the said driven shaft a predetermined percentage of torque from the driving shaft comprising plate supports, a plurality of plates slidably mounted on the said supports and provided with undulations on their inner peripheries adapted upon rotation of the disk wheel on the driving shaft to engage with the lugs on the said shuttle; and means for shifting the said plates on their supports to selectively move the said undulations into and out of operative engagement with the lugs on the shuttle.

JOHN RANDALL BLACK.